US008195047B2

(12) United States Patent
Chou

(10) Patent No.: US 8,195,047 B2
(45) Date of Patent: Jun. 5, 2012

(54) CABLE TELEVISION OPTICAL FIBER COMMUNICATION SYSTEM

(75) Inventor: Huitsuo Chou, Hsinchu County (TW)

(73) Assignee: Ming-Feng Ho, Hsinchu County (TW)

( * ) Notice: Subject to any disclaimer, the term of this patent is extended or adjusted under 35 U.S.C. 154(b) by 506 days.

(21) Appl. No.: 12/430,116

(22) Filed: Apr. 27, 2009

(65) Prior Publication Data

US 2010/0107211 A1 Apr. 29, 2010

(30) Foreign Application Priority Data

Oct. 24, 2008 (TW) .............................. 97140996 A

(51) Int. Cl.
*H04J 14/00* (2006.01)

(52) U.S. Cl. .............................. 398/66; 398/70; 398/71

(58) Field of Classification Search .............. 398/66–72
See application file for complete search history.

(56) References Cited

U.S. PATENT DOCUMENTS

| | | | | |
|---|---|---|---|---|
| 2001/0030785 | A1 * | 10/2001 | Pangrac et al. | 359/125 |
| 2004/0264964 | A1 * | 12/2004 | BuAbbud | 398/72 |
| 2007/0212070 | A1 * | 9/2007 | Farmer et al. | 398/67 |
| 2007/0292133 | A1 * | 12/2007 | Whittlesey et al. | 398/72 |
| 2008/0124083 | A1 * | 5/2008 | Esser et al. | 398/68 |

* cited by examiner

*Primary Examiner* — Dzung Tran
(74) *Attorney, Agent, or Firm* — CKC & Partners Co., Ltd.

(57) ABSTRACT

A Cable Television optical fiber communication system is disclosed, comprises a provider end, plural optical signal transmission devices and plural user ends, each optical signal transmission device is provided between the provider end and the user ends and has an light splitting element, a RF receive module, and a RF return module. The light splitting element is connected to the provider end via an optical transmission wire and is served to bi-directionally transfer a laser beam having a signal between the provider end and the user ends. The RF receive module is served to transfer a first signal of the provider end to the user ends. The RF return module emits a laser beam having a second signal to the provider end only when an analog return signal is emitted from the user end.

5 Claims, 4 Drawing Sheets

CABLE TELEVISION OPTICAL FIBER COMMUNICATION SYSTEM

RELATED APPLICATIONS

This application claims priority to Taiwan Application Serial Number 97140996, filed Oct. 24, 2008, which is herein incorporated by reference.

BACKGROUND

1. Field of Invention

The present invention relates to a signal communication system, more particularly to a cable television optical fiber communication system and optical signal transmission device thereof.

2. Description of Related Art

For a conventional Optical Cable Television System, operations of signal download/upload of plural set-top boxes (STBs) provided at user ends all communicate via a same optical fiber. That is, when a signal download operation for a user end is processed, image signals are downloaded from a center office (i.e. provider end) to the user end via an optical fiber, and when an upload operation for the user end is processed, the user end uploads analog signals to the center office via the same optical fiber. Another communication operation of a user end is that a return operation is individually designed so only uploading information is returned to a center office (i.e. provider end), one end thereof is connected to a getway of a FTTH (Fiber To The Home) via an optical fiber for receiving cable television signals received by the getway; the other end is connected to a user end for transferring television channel signals to the user end, upload information of the user end is returned to a light emitting end of the module for returning back to the center office.

The FTTH module is a method of optical fiber communication, an active optical network or a passive optical network can be adopted for information communication. Equipments of a center office of the passive optical network are provided on an optical line terminal (OLT). Optical signals downloaded from the optical line terminal are distributed to plural optical network units (ONU) by an optical wave distribution unit of an optical splitter via an optical fiber for providing a broad-band communication capacity of single end to plural ends.

When plural optical network units of user ends are simultaneously connected to one center office, regardless that whether the optical network units return signals back to the center office, each of the optical network units constantly emits lasers to the center office; because a receiving device of the center office is not able to simultaneously receive plural lasers emitted by the user ends, optical communication would be overloaded and not able to normally receive the lasers, work efficiency is therefore lowered. So how to provide a sufficient solution for improving the described disadvantage and also meet customers' needs and raise the competitiveness in the market place shall be seriously concerned.

SUMMARY

One object of the present invention is to provide a cable television optical fiber communication system, so that a receiving device at a provider end is prevented from receiving exceeding laser beams, therefore, an overload situation and abnormal receiving of signals are avoided.

Another object of the present invention is to provide a cable television optical fiber communication system, so that one provider end is able to receive returned information uploaded from plural set-top boxes, so that cost for equipments is lowered and efficiency of utilizing the equipments is increased.

According to the above mentioned objects, the present invention provides a cable television optical fiber communication system, comprises a provider end, plural user ends and plural optical signal transmission devices, and the provider end has an information source supplying equipment. Each of the user ends at least has one set-top box, and the set-top box is able to send an analog return signal to the information source supplying equipment. Each of the optical signal transmission devices is connected to the information source supplying equipment and the corresponding set-top box at the user end.

Each of the optical signal transmission devices includes a light splitting element, a RF receive module and a RF return module. The light splitting element is respectively connected to the RF receive module and the RF return module, and is externally connected to the information source supplying equipment provided at the provider end via an optical transmission wire, so a laser beam having a first signal is guided in or a laser beam having a second signal is guided out. The RF receive module is connected to the corresponding set-top box provided at the user end for processing the first signal of the laser beam and transferring to the set-top box provided at the user end. With respect to whether an analog return signal is emitted by the corresponding set-top box provided at the user end, each of the optical signal transmission devices determines to emit a laser beam having the second signal to the information source supplying equipment or determines to terminate the laser emitting.

Another aspect of the optical signal transmission device provided by the present invention includes an optical wave distribution element, a digital signal transmission block and an analog signal transmission block. The optical wave distribution element is connected to the described provider end via a first optical transmission wire, so a laser beam having a first analog signal is able to be guided into the analog signal transmission block, and a laser beam having first digital signal is able to be guided into the digital signal transmission block, and a laser beam having a second analog signal and a laser beam having a second digital signal are able to be guided out to the provider end.

The digital signal transmission block, that is connected to the optical wave distribution element and the user end, includes a first bi-directional optical sub-assembly capable of receiving the laser beam having the first digital signal and transferring to the user end and capable of emitting the laser beam having the second digital signal to the optical wave distribution element. The analog signal transmission block, that is connected to the optical wave distribution element and the user end, includes a second bi-directional optical sub-assembly capable of receiving the laser beam having the first analog signal and transferring to the user end and capable of emitting the laser beam having the second analog signal to the optical wave distribution element, wherein the analog signal transmission block emits a laser beam having the second analog signal to the optical wave distribution element only when an analog return signal is emitted from the user end.

The another aspect of the present invention integrates analog and digital signals into one optical signal transmission device, and the analog and the digital signals are able to be bi-directionally transferred between the provider end and the user ends.

BRIEF DESCRIPTION OF THE DRAWINGS

The structure and the technical means adopted by the present invention to achieve the above and other objectives can be best understood by referring to the following detailed description of the preferred embodiments and the accompanying drawings, where.

DESCRIPTION OF THE PREFERRED EMBODIMENTS

Figure 1:
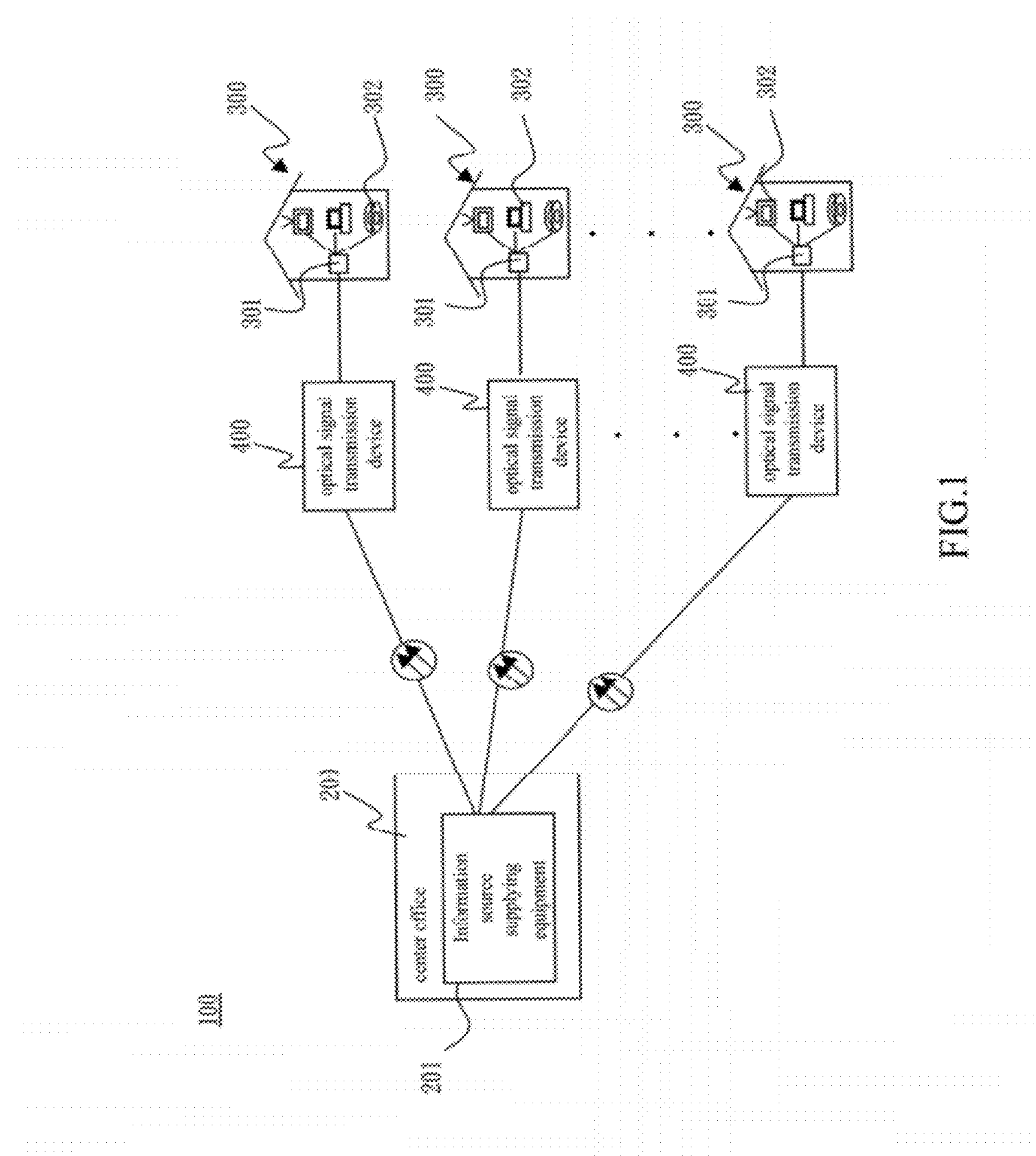
FIG. 1 is a block diagram illustrating one embodiment of the cable television optical fiber communication system provided by the present invention.

Referring to FIG. 1, which is a block diagram illustrating one embodiment of the cable television optical fiber communication system provided by the present invention. The present invention discloses a cable television optical fiber communication system, that is used in an information communicating sector of optical-fiber cable television, includes a center office (i.e. provider end) 200, plural user ends 300 and plural optical signal transmission devices 400. The center office 200 is served as a main information source for the user ends 300, and the center office 200 has an information source supplying equipment 201. Each of the user ends 300 has at least one set-top box 301. The set-top box 301 is connected to at least one electronic device 302, e.g. a television, a computer or a telephone, and the set-top box 301 is able to receive various information provided by the information source supplying equipment 201 via the corresponding optical signal transmission device 400 and then the set-top box 301 is able to transfer the received information to the electronic device 302, and to return an analog return signal, e.g. a request emitted from the user end 300, to the information source supplying equipment 201 via the optical signal transmission device 400. Each of the optical signal transmission devices 400 is corresponded to one of the user ends 300 and is provided between the center office 200 and the corresponding user end 300, and is optically connected to the information source supplying equipment 201 of the center office 200 and is electrically connected to the corresponding set-top box 301 at the user end 300.

Figure 2:
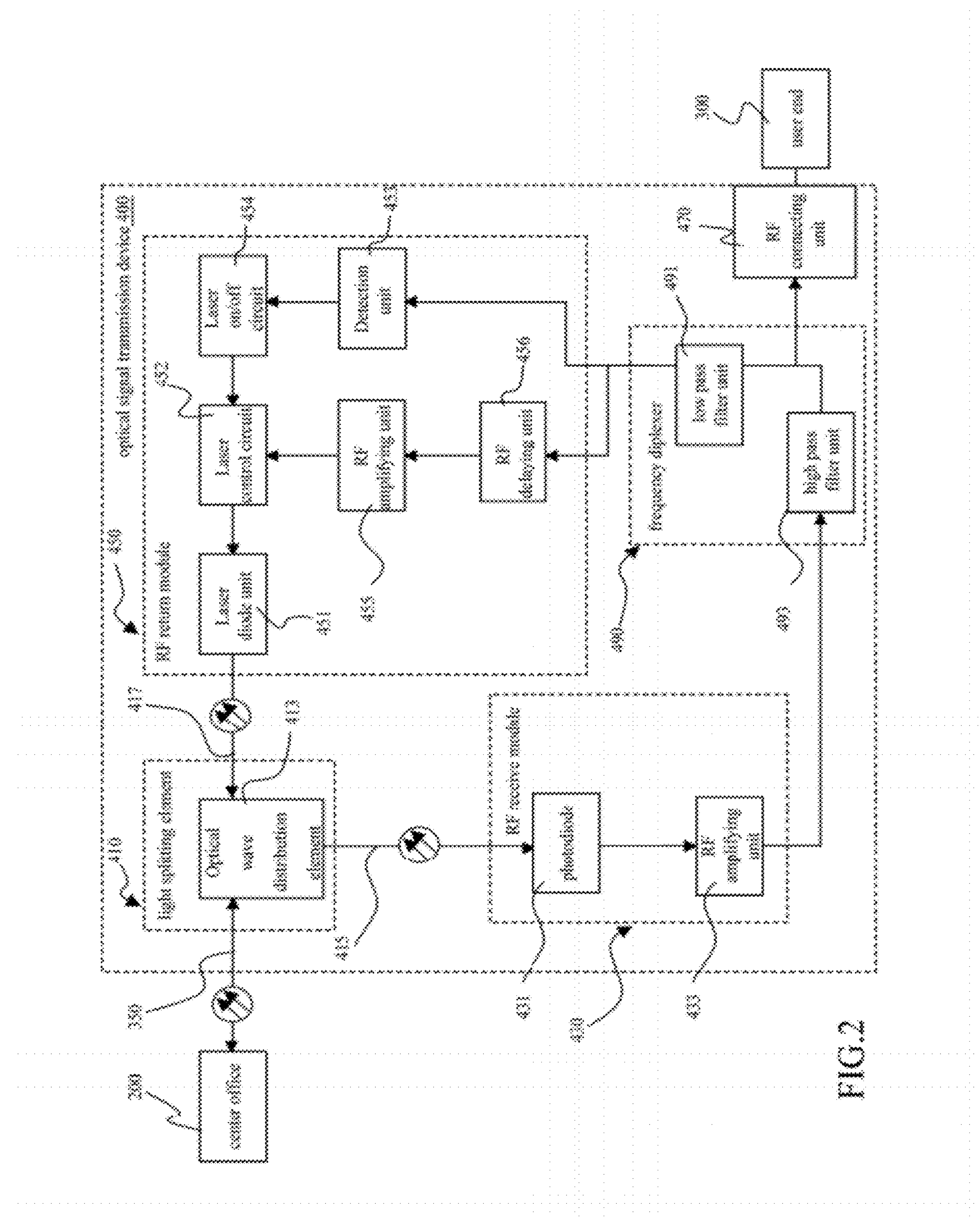
FIG. 2 is a block diagram illustrating a first form of the optical signal transmission device in the embodiment of the present invention.
Figure 3:
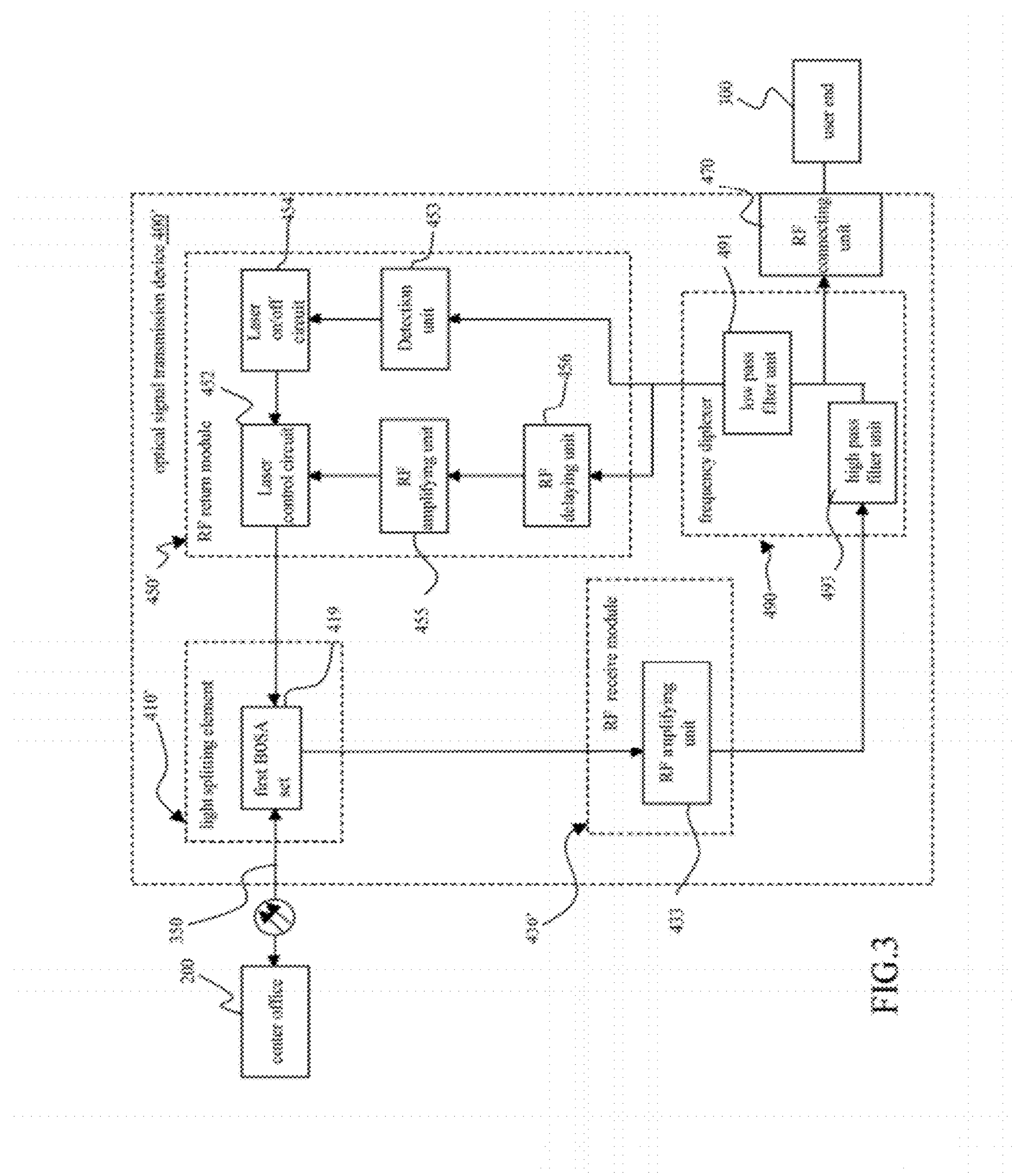
FIG. 3 is a block diagram illustrating a second form of the optical signal transmission device in the embodiment of the present invention.
Figure 4:
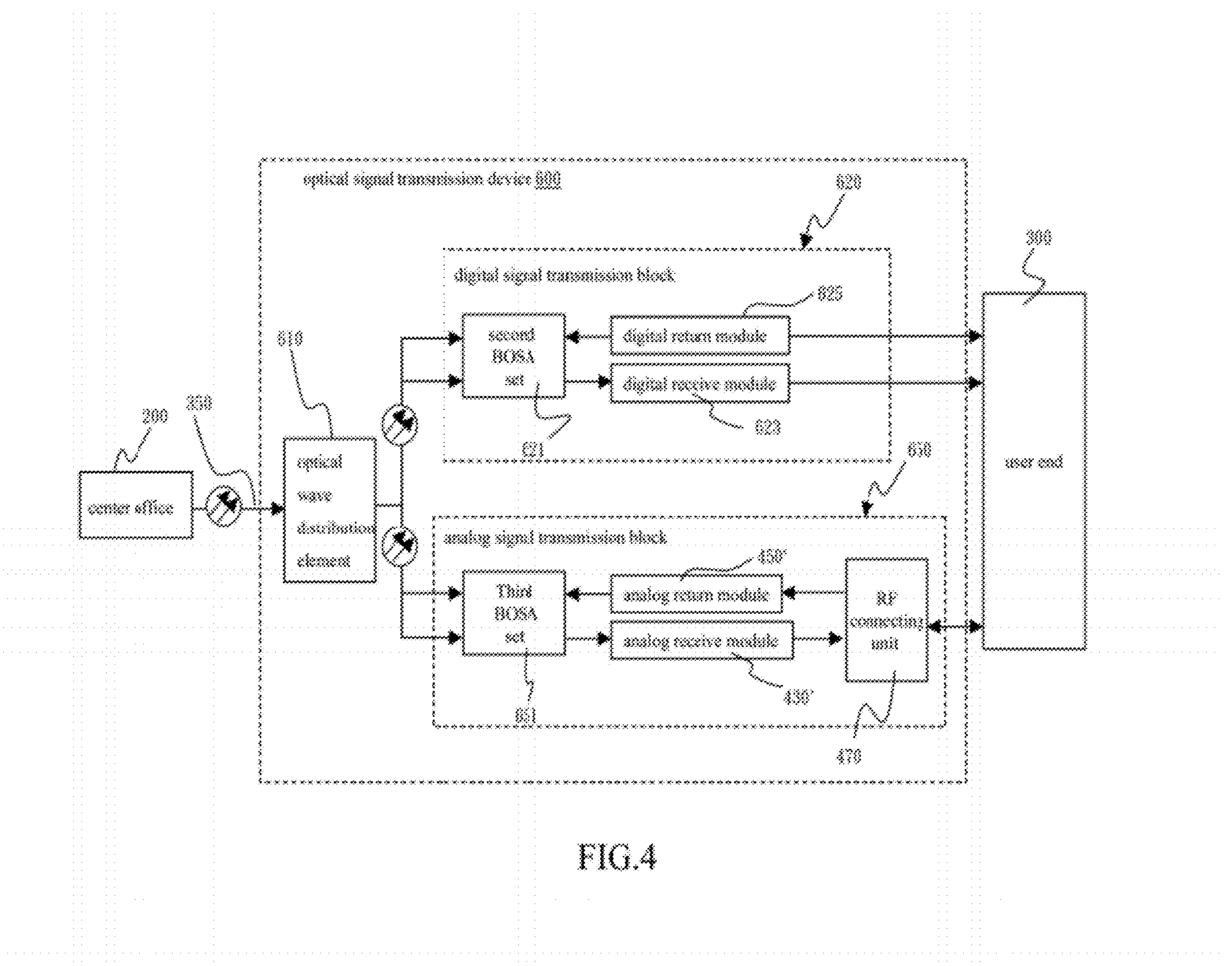
FIG. 4 is a block diagram illustrating the optical fiber transmission device provided in another embodiment the present invention.

The cable television optical fiber communication system 100 provided by the present invention discloses an optical signal transmission device 400 (as shown in FIG. 2 and FIG. 3) capable of individually transferring analog signals, or another optical signal transmission device 600 (as shown in FIG. 4) capable of integrating transmission of analog and digital signals. FIG. 2 is a block diagram illustrating a first form of the optical signal transmission device in the embodiment of the present invention. An optical signal transmission device 400 capable of individually transferring analog signals mainly includes an light splitting element 410, a RF receive module 430 and a RF return module 450. The light splitting element 410 is respectively connected to the RF receive module 430 and the RF return module 450, and is connected to the information source supplying equipment 201 of the center office 200 via plural first optical transmission wires 350, e.g. optical cables, for transferring information to each other via laser beams. For instance, a laser beam having a first signal transferred from the information source supplying equipment 201 is guided into the optical signal transmission device 400 by the light splitting element 401, or a laser beam having a second signal is guided out to the information source supplying equipment 201.

The RF receive module 430 and the RF return module 450 are able to be connected to the corresponding set-top box 310 via a RF connecting unit 470 of the optical signal transmission device 400, so the first signal, e.g. an optical signal or an analog RF signal, of the laser beam can be directly or indirectly processed by the RF receive module 430, and transferred to the corresponding set-top box 301 at the user end 300. The RF return module 450 emits a laser beam to the information source supplying equipment 201 so a second signal is able to be returned to the information source supplying equipment 201.

For avoiding a situation that laser beams are continuously and simultaneously emitted to the center office 200 from the plural user ends 300 which will result in that the information source supplying equipment 201 receives exceeding laser power and an overloading status may be occurred, so the RF return module 450 emits a laser beam to the information source supplying equipment 201 only when an analog return signal is returned by the user end 300. In other words, whenever the optical signal transmission device 400 determines that an analog return signal is emitted from the user end 300, the analog signal is converted into a second signal by the optical signal transmission device 400, and a laser beam is used to send the second signal to the center office 200, and whenever an operation that the analog return signal is emitted from the set-top box 301 at the user end 300 is complete, the optical signal transmission device 400 stops emitting the laser beam. So the information source supplying equipment 201 stops receiving the laser beam for avoiding an overloading situation.

The information source supplying equipment 201 of the center office 200 individually obeys an emitting mode with each of the RF return modules 450 of the optical signal transmission devices 400, so within one certain period of time, e.g. every second, each of the RF return modules 450 of the optical signal transmission devices 400 asynchronously emits a laser beam having the second signal, so the optical signal transmission devices 400 are prevented from emitting laser beams to the information source supplying equipment 201 at the same time.

As shown in FIG. 1 and FIG. 2, which illustrate the first form of this embodiment, the light splitting element 410 can be an optical wave distribution element 413. The optical wave distribution element 413 does not process the signal transformation, but the optical wave distribution element 413 guides the laser beam having the first signal to the RF receive module 430 or guides the laser beam having the second signal to the information source supplying equipment 201 at the center office end 201 according to a difference of the wavelengths of the laser beams. The optical wave distribution element 413 can be a wavelength division multiplexing (WDM), an array waveguide grating (AWG), a variable optical attenuator, an optical fiber coupler, an optical fiber insulator, an optical circulator, an optical grating, a thin film wave filter or a grin lens.

At the first form of this embodiment, the RF receive module 430 includes a photodiode 431 and a RF amplifying unit 433. The photodiode 431 is connected to the optical wave distribution element 413 via a second optical transmission wire 415, and is able to receive laser beams having the first signal and convert the first signal into a first RF signal. The RF amplifying unit 433 is connected to the photodiode 431 to amplify the first RF signal.

The RF return module 450 includes a laser diode unit 451, a laser control circuit 452, a detection unit 453, a laser on/off circuit 454, a RF amplifying unit 455 and a RF delaying unit 456. The laser diode unit 451 is connected to the optical wave distribution element 413 via a third optical transmission wire 417. The detection unit 453 is respectively connected to the RF connecting unit 470 and the laser on/off circuit 454, and is served to continuously monitor the set-top box 301 at the user end 300 for determining whether an analog return signal is generated and emitted from the set-top box 301. If an analog return signal generated and emitted from the set-top box 301 is detected, the laser on/off circuit 454 is notified by the detection unit 453 for activating the laser control circuit 452; if no analog return signal emitted from the set-top box 301 any more after the set-top box 301 finishes to emit the analog return signal, the laser on/off circuit 454 is notified by the detection unit 453 for terminating the laser control circuit 452. Therefore the operation of the laser control circuit 452 is stopped.

The laser control circuit 452 is respectively connected to the laser diode unit 451 and the laser on/off circuit 454. The laser diode unit 451 is enabled by the laser control circuit 452 after the laser control circuit 452 is activated by the laser on/off circuit 454. After the analog return signal returned from the set-top box 301 is passed to the laser diode unit 451 via the RF amplifying unit 455, the RF delaying unit 456 and the laser control circuit 452, the analog return signal is converted by the laser diode unit 451 and a laser beam having the second signal is transferred to the optical wave distribution element 413 via the third optical transmission wire 417, then, the laser beam having the second signal is guided to the information source supplying equipment 201 by the light splitting element 413. After the laser control circuit 452 is terminated by the laser on/off circuit 454, the laser diode unit 451 stops emitting laser.

As mentioned above, before the analog return signal is transferred to the laser control circuit 452, the analog return signal has to in sequence pass through the RF delaying unit 456 and the RF amplifying unit 455, so the analog return signal is able to be delayed till the laser diode unit 451 is enabled, then the analog return signal is amplified by the RF amplifying unit 455 for preventing the laser beam from sending an incomplete signal.

Referring to FIG. 1 and FIG. 3. FIG. 3 is a block diagram illustrating a second form of the optical signal transmission device in the embodiment of the present invention. In the second form of this embodiment, the light splitting element 410' is a bi-directional optical sub-assembly 419 and hereinafter said bi-directional optical sub-assembly 419 is referred as the first BOSA set, the BOSA set 419 has a function of emitting a laser beam and converting a first signal of the laser beam into a first RF signal.

So in the RF receive module 430' and the RF return module 450' of the second form of this embodiment, the photodiode 431 of the RF receive module 430 described in the first form and the laser diode unit 451 of the RF return module 450 described in the first form are not needed. So when the detection unit 453 determines that an analog return signal is emitted by the set-top box 301, after the laser on/off circuit 454 is notified by the detection unit 453 and then the laser on/off circuit 454 activates the laser control circuit 452 to enable the first BOSA set 419, then the first BOSA set 419 converts the analog return signal and emits a laser beam having the second signal to the information source supplying equipment 201 via the first optical transmission wire 350. After the operation that the set-top box 301 emits the analog return signal is complete, the laser on/off circuit 454 is notified by the detection unit 453 for terminating the laser control circuit 452, the operation of the laser control circuit 452 is stopped therefore the first BOSA set 419 is disabled, so the laser emitting operation is temporarily stopped.

The optical signal transmission device 400 disclosed at the first and the second forms in this embodiment further includes a frequency diplexer 490, the frequency diplexer 490 includes a low pass filter unit 491 and a high pass filter unit 493, the low pass filter unit 491 is electrically connected to the RF return module 450 and is served to restrain the first RF signal from being transferred to the RF return module 450. The high pass filter unit 493 is electrically connected to the RF receive module 430 and is served to restrain the analog return signal from being transferred to the RF receive module 430.

As shown in FIG. 4, which is a block diagram illustrating another embodiment of the Cable Television optical fiber communication system provided by the present invention. In this embodiment, an optical signal transmission device 600 capable of integrating transmission of analog and digital signals includes an optical wave distribution element 610, a digital signal transmission block 620 and an analog signal transmission block 650. The light splitting element 610 is connected to the center office 200 via the connecting means disclosed at the preceding embodiment, and via the analog signal transmission block 650 and the digital signal transmission block 620, the optical wave distribution element 610 bi-directionally guides laser beams with different wavelengths being transferred between the user ends 300 and the center office 200.

The digital signal transmission block 620 is optically connected to the optical wave distribution element 610 and is electrically connected to the user ends 300, and The digital signal transmission block 620 has a second bi-directional optical sub-assembly (called second BOSA set 621 hereinafter), a digital receive module 623 and a digital return module 625. Via the optical wave distribution element 610, the second BOSA set 621 is served to receive a laser beam having a first digital signal from the center office 200 and to transfer the first digital signal to the digital receive module 623, then the digital receive module 623 transfers the first digital signal to the user ends 300. After a digital return signal is emitted from the user end 300, according to the content of the digital return signal, the second BOSA set 621 emits a laser beam having a second digital signal to the optical wave distribution element 610.

The analog signal transmission block 650 is connected to the optical wave distribution element 610 and is electrically connected to the user ends 300, the analog signal transmission block 650 has a third bi-directional optical sub-assembly (called third BOSA set 615 hereinafter). Via the optical wave distribution element 610, the third BOSA set 651 receives a laser beam having a first analog signal from the information source supplying equipment 201, after the first analog signal is converted into a first RF signal and the first analog signal is transferred to the user ends 300, an analog return signal can be converted into a second analog second by the third BOSA set 651 and a laser beam having the second analog signal is emitted to the optical wave distribution element 610. The analog signal transmission block 650 emits the laser beam having the second analog signal to the light splitting element 610 only when an analog return signal is emitted by the user end 300.

The optical signal transmission device 600 is able to integrate digital and analog signals into one single device, so the analog and the digital signals can be bi-directionally transferred between the center office 200 and the user ends 300, so a situation of the information source supplying equipment 201 overloading can be overcome.

The analog signal transmission block 650 is able to be served as the optical signal transmission device 400' disclose at the second form of the preceding embodiment, the RF receive module 430' is connected to the third BOSA set 651 for processing the first analog signal and transferring to the user ends 300. The RF return module 450' is connected to the third BOSA set 651, wherein the laser control circuit 452 of the RF return module 450' is electrically connected to the third BOSA set 651 for enabling or disabling the third BOSA set 651 to emit laser beams. The laser on/off circuit 454 is respectively connected to the detection unit 453 and the laser control circuit 452. When the detection unit 453 determines an analog return signal is emitted from the user end 300, the laser on/off circuit 454 drives the laser control circuit 452 to enable the third BOSA set 651 or drives the laser control circuit 452 to disable the third BOSA set 651.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cable television optical fiber communication system, comprising:

a provider end having an information source supplying equipment;

plural user ends, each of the user ends having at least one set-top box served to emit an analog return signal to the information source supplying equipment; and plural optical signal transmission devices, each of the optical signal transmission devices respectively connected to the information source supplying equipment and one of the set-top boxes at the user ends, the optical signal transmission device comprising:

bi-directional optical sub-assembly (BOSA) connected to the information source supplying equipment via an optical transmission wire and respectively served to convert a first signal of a laser beam into a first RF signal, and convert the analog return signal into a second signal and emit a laser beam having the second signal towards the information source supplying equipment;

a RF receive module respectively connected to the BOSA and the set-top box provided at the user end, and served to process the first RF signal from the BOSA, and transfer the first RF signal to the set-top box at the user end; and a RF return module respectively connected to the BOSA and the set-top box at the user end, the RF return module comprises:

a detection unit served to detect whether the analog return signal is generated from the user end;

a laser control circuit electrically connected to the BOSA and served to enable or disable the BOSA; and a laser on/off circuit respectively connected to the detection unit and the laser control circuit, wherein when the detection unit detects that one of the user end starts to transfer an analog return signal to the RF return module, the laser on/off circuit drives the laser control circuit to enable the BOSA, when the detection unit detects that the user end stops transferring the analog return signal, the laser on/ff circuit drives the laser control circuit to disable the BOSA.

2. The cable television optical fiber communication system as claimed in claim 1, wherein the information source supplying equipment enables the RF return module of each of the optical signal transmission devices asynchronously emitting the laser beam having the second signal.

3. The cable television optical fiber communication system as claimed in claim 1, wherein the RF receive module comprises a RF amplifying unit electrically connected to the BOSA and served to amplify the first RF signal.

4. An optical signal transmission device, which implements in a cable television optical fiber communication system, the optical signal transmission device comprising:

a first bi-directional optical sub-assembly (BOSA) connected to a provider end via a first optical transmission wire and served to guide in a laser beam having a first signal , to convert the first signal into a first RF signal, and to convert an analog return signal from a user end into a second signal. and to emit and guide a laser beam having the second signal out to the provider end;

a RF receive module connected to the first BOSA and served to process the first RF signal and transfer to a user end; and a RF return module respectively connected to the first BOSA and comprising:

a detection unit served to detect whether the analog return signal is generated from the user end;

a laser control circuit electrically connected to the first BOSA and served to enable or disable the first BOSA for emitting a laser beam; and a laser on/off circuit respectively connected to the detection unit and the laser control circuit, wherein when the detection unit detects that the analog return signal starts to be transferred from the user end, the laser on/off circuit drives the laser control circuit to enable the first BOSA, when the detection unit detects that the user end stops transferring the analog return signal, the laser on/ff circuit drives the laser control circuit to disable the first BOSA.

5. The optical signal transmission device as claimed in claim 4, wherein the optical signal transmission device further includes a frequency diplexer, the frequency diplexer comprising:

a low pass filter unit electrically connected to the RF return module and served to restrain the first RF signal from being transferred to the RF return module; and a high pass filter unit electrically connected to the RF receive module and served to restrain the analog return signal from being transferred to the RF receive module.

* * * * *